June 24, 1969    J. J. LAIDIG    3,451,567
SILO UNLOADER AND METHOD OF REMOVING MATERIAL FROM A SILO
Filed Sept. 13, 1967    Sheet 1 of 2

United States Patent Office 3,451,567
Patented June 24, 1969

3,451,567
SILO UNLOADER AND METHOD OF REMOVING MATERIAL FROM A SILO
Jonathan J. Laidig, Mishawaka, Ind., assignor to Laidig Silo Unloaders, Inc., a corporation of Delaware
Filed Sept. 13, 1967, Ser. No. 667,487
Int. Cl. B65g 65/40, 33/10; A01f 25/16
U.S. Cl. 214—17
9 Claims

ABSTRACT OF THE DISCLOSURE

A bottom silo unloader and method, in which an unloader of the type which has a sweep arm that rotates about the axis of the silo and is provided with a radial shield and a cutting and conveying auger which cooperates with the shield to cut and feed material into a central opening in the floor of the silo is characterized by the fact that the sweep arm shield and auger have their outer ends spaced inwardly from the silo wall, and a tapered auxiliary cutting and conveying screw forms a coaxial extension of the auger and has no shield, so that only a portion of material cut by the auxiliary screw is moved into the auger and the rest of said material remains adjacent to the wall in a relatively loose mass which partially supports the body of material above it and affords controlled lowering of said body of material.

Background of the invention

The present invention constitutes an improvement upon the structure and method disclosed in Laidig application 561,832, filed June 30, 1966, issued Dec. 5, 1967 as Patent 3,356,235.

Bottom unloaders for silos are theoretically the most desirable because they remove the oldest silage first, and the new silage may be put into the top of the silo before it is completely empty. Furthermore, they remove silage which has not been exposed to air since it was put in the silo, and accordingly spoilage is held to a minimum. Furthermore, silage at the bottom of a silo is less likely to be frozen in winter when silage is most heavily used for animal feeding. However, there are certain difficulties associated with the use of bottom silo unloaders, among which is the way that the silage packs in the silo. Tiedemann Patent 2,635,770 discloses the findings of A. O. Smith Company that the highest density of material in a silo is adjacent the wall. This high density is aggravated by the fact that it is the silage closest to the wall which is most likely to freeze. During the period of nearly 17 years since the application for the Tiedemann patent was filed, considerable work has been done with bottom silo unloaders, and today one of the preferred techniques for unloading is to initially leave a wall of silage about 14" to 16" wide against the silo wall, cutting out only the silage in the central area as first, and to thereafter cut out most of the wall. Such a method is disclosed in Dueringer et al. Patent 2,736,461.

Laidig Patent 3,356,235 discloses a bottom silo unloader in which the unloader sweep arm has its shield and cutting and conveying auger terminate about 16" from the silo wall where they are supported on a carriage which rides on a drive track in the floor. This takes the sweep arm and the sweep arm drive out of the area of densely packed material adjacent to the wall. The structure of Patent 3,356,235 discloses a removable end shield section and a removable auxiliary auger section so that, if desired, the unloader may be operated in a manner similar to the method disclosed in said Dueringer et al. Patent 2,736,461.

A principal purpose of the Dueringer et al. method is to so control the formation of an arch at the bottom of the mass of packed material in a silo that the material will move downwardly at a substantially uniform rate so as to provide for efficient operation of the silo unloader at the bottom of the structure. This object, together with a reduction in power requirements during operation of the silo unloader, is achieved by first cutting a dome of relatively small radial dimensions by operating the unloader with the section nearest the silo wall omitted. After the unloader has operated for a couple of revolutions around the silo to form the narrow dome, an end section is added to the cutter-conveyor so as to cut the material nearly to the silo wall and thus increase the dome in diameter to the point where the narrow wall of material against the silo wall can no longer support the weight of material above it so that the main mass of material in the silo feeds downwardly into the area where it may be cut and conveyed by the sweep arm.

The present application discloses an improvement in the apparatus of Laidig Patent 3,356,235 and an improved method of using said apparatus, so as to provide better control over the downward feed of material in the silo and also to eliminate the need for getting into the silo to add the extension to the sweep arm shield and the auxiliary auger section.

Summary of the invention

The principal object of the present invention is to provide an improved bottom unloader for silos and method of operating such an unloader which affords better control over the downward movement of the body of material in the silo than is provided by methods heretofore known.

Another object of the invention is to provide a bottom silo unloader the power requirements of which are substantially reduced as against the structure of Laidig Reissue Patent 25,863, but that avoids the need for operating initially with parts of the sweep arm removed and later adding such parts to the sweep arm when it is necessary to do so with the sweep arm under the material in the silo.

Still another object of the invention is to provide a silo unloader which has a cutting and conveying screw portion nearest the silo wall that is tapered toward the wall so that the bottom of the mass of silage closest to the wall, after the unloader has made one revolution about the silo, is inclined downwardly toward the wall.

Description of the drawings

The invention is illustrated in a preferred embodiment in the accompanying drawings in which.

*Detailed description*

Figure 1:
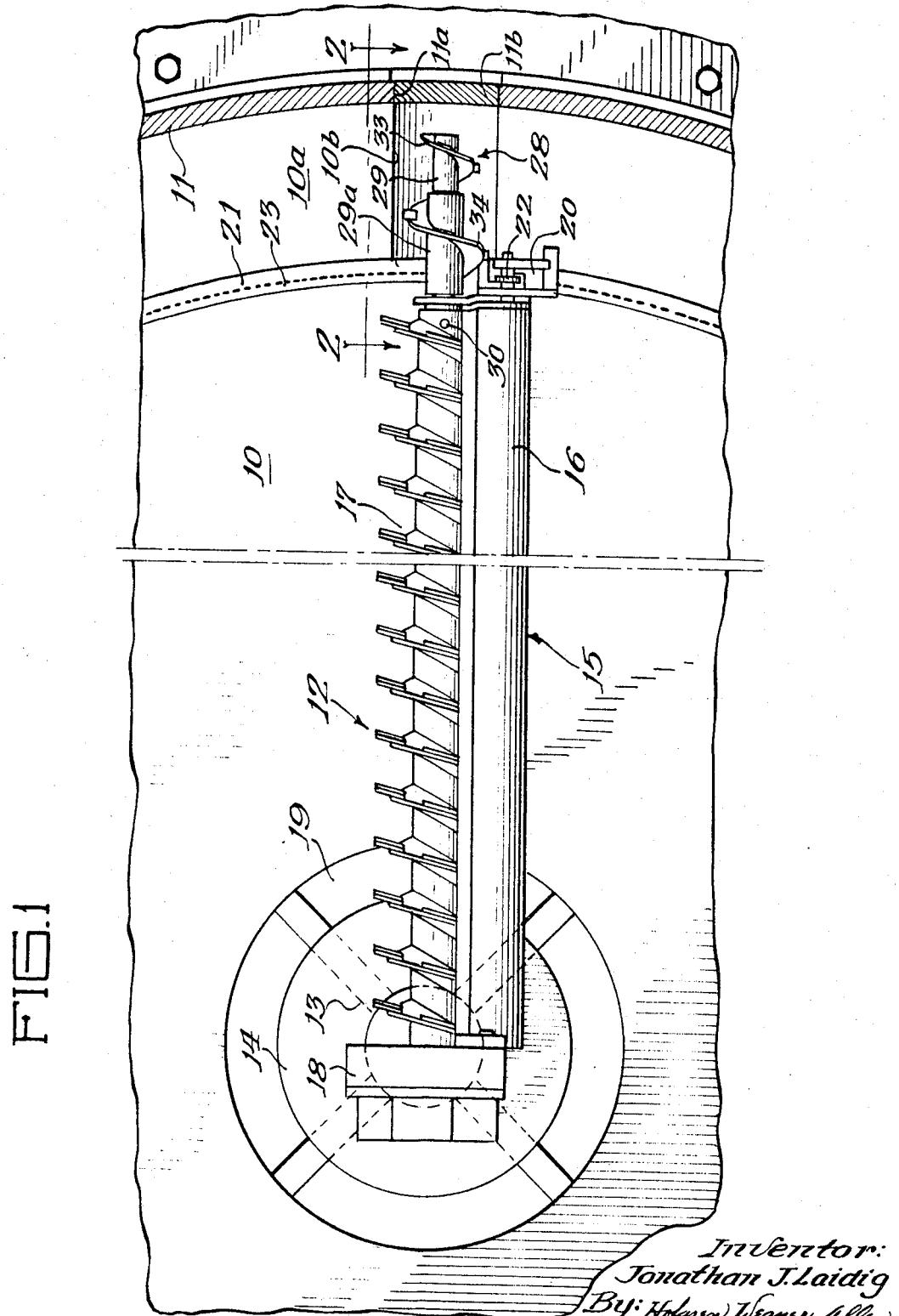
FIG. 1 is a fragmentary horizontal sectional view of a silo affording a top plan view of a silo unloader embodying the invention.
Figure 2:
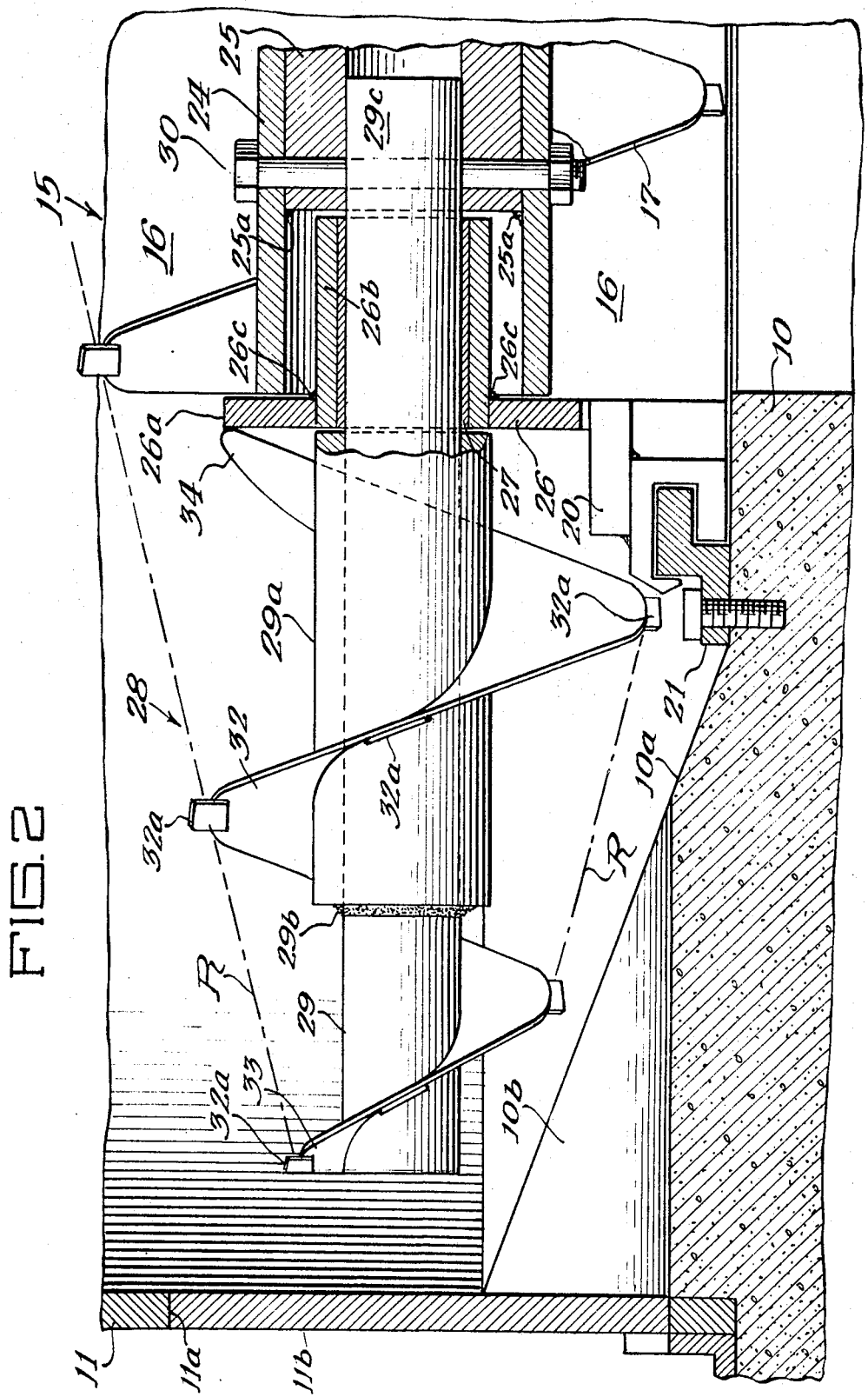
FIG. 2 is a fragmentary section on an enlarged scale taken generally as indicated along the line 2—2 of FIG. 1.

Referring to the drawings in greater detail, a silo has a floor 10 and a wall 11; and a silo unloader, indicated generally at 12, has its inner end 13 supported upon a turntable 14 which rotates about the axis of the silo so that an unloader sweep arm, indicated generally at 15, traverses the entire silo floor. The sweep arm includes a shield 16 and a cutter-conveyor auger 17 which is driven by a motor (not shown) through a gear box 18 to cut material in the silo. The cutter-conveyor auger 17 and the shield 16 cooperate to move cut material toward the center of the silo where it drops through an opening 19 in the floor surrounding the turntable 14. The outer end of the sweep arm 15 is supported upon a carriage 20 that rides upon a track 21; and a toothed drive wheel 22 on the carriage cooperates with the holes 23 in the track 21 to drive the sweep arm 15 around the silo. The track 21 is located on the floor 10 about 16″ or 18″ radially inwardly from the silo wall 11; and both the shield 16 and cutter-conveyor auger 17 terminate approximately at the drive track 21. As seen in FIG. 2, the floor 10 of the silo between the drive track 21 and the wall 11 has a portion 10a which is inclined upwardly toward the wall. An access port 11a in the wall 11 of the silo is provided with a removable closure 11b, and inside the access port the inclined floor section 10a is provided with a groove 10b for a purpose which will be described.

For a more detailed description of the silo unloader, and particularly the connection between the sweep arm 15 and the carriage 20, and for details of the relationship between the carriage 20 and the drive track 21, reference may be had to Patent 3,356,235.

Referring now particularly to FIG. 2, the cutter conveyor auger 17 is seen to include a hollow shaft 24 in the outer end of which a bushing 25 is welded as indicated at 25a. A liner carrier 26 containing a bronze liner 27 is supported on the shoe 20, and the carrier consists of an annular flange 26a which embraces the end of a carrier sleeve 26b and is welded to the latter at 26c.

Auxiliary cutter and conveyor screw means, indicated generally at 28, includes a shaft 29 which extends through a sleeve 29a and is welded thereto at 29b. Shaft 29 is journalled in the bronze liner 27 and has its inner end portion 29c mounted in bushing 25 where it is impaled by a bolt 30 that also extends through the hollow shaft 24 and the bushing 25 to secure the auxiliary cutter-conveyor screw means 28 to the end of the hollow auger shaft 24.

A conveyor flight 32 provided with blades 32a has an outer end 33 of very small diameter; and the surface of rotation of the auxiliary cutter-conveyor screw 28, indicated in FIG. 2 by the broken lines R, is substantially frusto-conical as the diameter of the flight 32 increases from its outer end 33 to its inner end 34. Likewise, the pitch of the flight 32 changes from a short pitch nearest the outer end of the auxiliary cutter-conveyor screw to a longer pitch near its inner end.

As seen in the drawings, there is no shield in association with the auxiliary cutter-conveyor screw 28, so that as the sweep arm traverses hard packed material in the bottom of the silo the auxiliary cutter-conveyor screw operates to cut and churn up the hardest packed material adjacent the silo wall; but because of the absence of any shield which would cooperate with the auger to provide efficient feeding of material radially inwardly to the cutter-conveyor 17, a large percentage of the material that is cut by the auxiliary cutter-conveyor screw 28 is not fed out of the area near the silo wall on the first pass of the unloader sweep arm around the silo. It is estimated that no more than about 50% of the hard packed material adjacent to the silo wall is moved into the main cutter-conveyor auger 17 by the cutter-conveyor screw 28; and the remaining 50%, more or less, of that material remains on the floor adjacent to the silo wall where it partially supports the packed body of material above it and affords controlled lowering of the body of material.

The manner in which the auxiliary cutter-conveyor screw 28 mounts upon the stub shaft 26 requires that the screw 28 be slid endwise off the stub shaft 26, and this can be done only by positioning the sweep arm opposite the access port 11a where the auxiliary cutter-conveyor screw 28 may be removed endwise along the groove 10b in the inclined portion 10a of the floor of the silo.

It is highly desirable for the auxiliary cutter-conveyor screw 28 to be removable, because as taught in Laidig application 561,832 different auger pitches and degrees of taper are more or less efficient in cutting and handling different kinds of material; so it is desirable to mount screw members 28 of different characteristics on the end of the cutter-conveyor auger 17 for handling different kinds of material.

The foregoing detailed description is given for clearness of understanding only, and no unnecessary limitations should be understood therefrom, as modifications will be obvious to those skilled in the art.

I claim:

1. In a bottom silo unloader of the type which has a sweep arm that rotates about the axis of the silo and is provided with a radial shield and a cutting and conveying auger of predetermined conveying characteristics which cooperates with the shield to cut and feed material into a central opening in the floor of the silo as the sweep arm rotates, the improvement which comprises: the sweep arm shield and auger have their outer ends spaced inwardly from the silo wall, and an auxiliary cutting and conveying screw having conveying characteristics different from those of the auger forms an unshielded coaxial extension of the cutting and conveying auger to a point close to the silo wall, whereby only a portion of material cut by the auxiliary screw is moved into the auger and the rest of said material remains adjacent the wall in a relatively loose mass which partially supports the body of material above it and affords controlled lowering of said body of material.

2. The improvement of claim 1 in which the screw is tapered toward its outer end.

3. The improvement of claim 2 in which the auxiliary screw has a pitch which increases progressively from the free end of the screw inwardly.

4. The improvement of claim 1 in which the auxiliary screw has a pitch which increases progressively from the free end of the screw inwardly.

5. The improvement of claim 2 in which a portion of the silo floor which extends from near the outer end of the auger to the silo wall is inclined upwardly so as to be substantially parallel to the surface of revolution of the auxiliary screw.

6. The improvement of claim 5 which includes means removably mounting the auxiliary screw on the end of the cutting and conveying auger, a radial groove in the inclined portion of the silo floor, and an access port in the silo wall at the outer end of said groove, whereby the sweep arm may be positioned in radial alignment with said port or removal of the auxiliary screw by moving it along said groove and through said port.

7. In the method of removing packed material from the bottom of a silo which has a continuous annular wall and a floor having a central outfeed opening, by cutting a layer of the packed material that is nearest the silo floor, first simultaneously along the entire length of a generally radial line that extends substantially from the silo wall to the silo axis, and then progressively extending the cut area from said line circumferentially around the silo while moving the cut material progressively toward the central outfeed opening, the improvement which comprises: loosening the material in said layer in the area nearest the silo wall; moving only a portion of said loosened material toward the central opening while cutting and moving substantially all material in said layer from the more central area of the silo into the opening; and leaving a substantial percentage of the loosened material near the wall where it may partially support the body of packed material above it and control the rate at which said body of material descends.

8. The method of claim 7 in which no more than about half of the loosened material in the area nearest the wall is moved toward the opening until after the cutting of said layer has progressed once completely around the silo.

9. The method of claim 7 in which, after said layer of material has been cut and moved, the bottom of the body of packed material thereabove is generally parallel to the floor in the more central area of the silo and in the area nearest the wall inclines toward the floor as it approaches the wall.

References Cited

UNITED STATES PATENTS 3,356,235   12/1967   Laidig _____ 214—17

ROBERT G. SHERIDAN, *Primary Examiner.*

U.S. Cl. X.R.

198—214; 214—152